(12) United States Patent
Kitahata et al.

(10) Patent No.: US 8,039,423 B2
(45) Date of Patent: Oct. 18, 2011

(54) LUBRICANT COMPOSITION, SPEED REDUCTION GEAR USING THE LUBRICANT COMPOSITION, AND ELECTRIC POWER STEERING APPARATUS USING THE SPEED REDUCTION GEAR

(75) Inventors: Kouji Kitahata, Osaka (JP); Fumiaki Kasahara, Osaka (JP); Yoshimasa Shirai, Osaka (JP); Takashi Okaniwa, Tokyo (JP); Satoshi Yamazaki, Tokyo (JP)

(73) Assignees: JTEKT Corporation (JP); Kyodo Yushi Co., Ltd. (JP)

( * ) Notice: Subject to any disclaimer, the term of this patent is extended or adjusted under 35 U.S.C. 154(b) by 834 days.

(21) Appl. No.: 10/593,820

(22) PCT Filed: Mar. 23, 2005

(86) PCT No.: PCT/JP2005/005988
§ 371 (c)(1),
(2), (4) Date: Sep. 22, 2006

(87) PCT Pub. No.: WO2005/090529
PCT Pub. Date: Sep. 29, 2005

(65) Prior Publication Data
US 2007/0180944 A1      Aug. 9, 2007

(30) Foreign Application Priority Data
Mar. 24, 2004   (JP) .................................. 2004-087853

(51) Int. Cl.
*C10M 135/10* (2006.01)
*C10M 149/00* (2006.01)

(52) U.S. Cl. ........ 508/390; 508/156; 508/180; 508/464; 508/465; 508/551; 508/585; 508/588; 508/591

(58) Field of Classification Search ................. 508/387, 508/390, 391, 459, 460, 462, 590, 591, 156, 508/180, 464, 465, 551, 588, 585
See application file for complete search history.

(56) References Cited

U.S. PATENT DOCUMENTS

| 3,652,414 | A | * | 3/1972 | Bergeron ...................... 508/119 |
| 4,560,489 | A | | 12/1985 | Muir et al. |
| 5,354,487 | A | * | 10/1994 | Aoki et al. .................... 508/543 |
| 6,444,621 | B1 | | 9/2002 | Okaniwa et al. |
| 2003/0022797 | A1 | * | 1/2003 | Oohira et al. ................. 508/107 |
| 2003/0136211 | A1 | | 7/2003 | Ishii et al. |

(Continued)

FOREIGN PATENT DOCUMENTS

JP          04-266995        9/1992

(Continued)

*Primary Examiner* — Ellen McAvoy
*Assistant Examiner* — Taiwo Oladapo
(74) *Attorney, Agent, or Firm* — Rabin & Berdo, PC

(57) ABSTRACT

Disclosed are a lubricant composition including a lubricating base oil, fine particles and a calcium sulfonate-based thickener, a speed reduction gear filled with the lubricant composition, and an electric power steering apparatus including the speed reduction gear. The invention reduces operating noise of the speed reduction gear, regardless of the amount of backlash that occurs on combining a small gear and a large gear and without a more complicated structure for the speed reduction gear, by action of the fine particles. Further, separation of oil is prevented, by action of the calcium sulfonate-based thickener of the lubricant composition, so that electric power steering apparatus noise within the inside of a car is reduced at a low cost.

5 Claims, 2 Drawing Sheets

U.S. PATENT DOCUMENTS

| | | |
|---|---|---|
| 2003/0176298 A1* | 9/2003 | Nakatani et al. .............. 508/398 |
| 2004/0016590 A1 | 1/2004 | Iwano |
| 2004/0186025 A1 | 9/2004 | Nakatani et al. |
| 2005/0221996 A1 | 10/2005 | Nakatani et al. |
| 2005/0221997 A1 | 10/2005 | Nakatani et al. |
| 2005/0221999 A1 | 10/2005 | Nakatani et al. |

FOREIGN PATENT DOCUMENTS

| | | |
|---|---|---|
| JP | 07-252490 | 10/1995 |
| JP | 11-035963 | 2/1999 |
| JP | 11-131086 | 5/1999 |
| JP | 2000-043739 | 2/2000 |
| JP | 2001-064665 | 3/2001 |
| JP | 2001-089778 | 4/2001 |
| JP | 2001-181668 | 7/2001 |
| JP | 2002-265969 | 9/2002 |
| JP | 2002-308125 | 10/2002 |
| JP | 2002-363589 | 12/2002 |
| JP | 2004-092721 | 3/2004 |
| JP | 2004-099847 | 4/2004 |
| WO | WO 2004/029184 A1 | 4/2004 |

* cited by examiner

LUBRICANT COMPOSITION, SPEED REDUCTION GEAR USING THE LUBRICANT COMPOSITION, AND ELECTRIC POWER STEERING APPARATUS USING THE SPEED REDUCTION GEAR

RELATED APPLICATION

This application is a continuation of Japanese Patent Application No. 2004-087853, filed Mar. 24, 2004, which is incorporated by reference in its entirety.

TECHNICAL FIELD

The present invention relates to a lubricant composition which can be preferably used for a speed reduction gear comprising a small gear such as worm gear and a large gear such as worm wheel, a speed reduction gear filled with the lubricant composition, and an electric power steering apparatus incorporating the speed reduction gear.

BACKGROUND ART

An electric power steering apparatus of an automobile uses a speed reduction gear. A column type EPS, for example, reduces the speed of rotation of an electric motor and increases output power in the course of transmitting power from a small gear such as a worm gear to a large gear such as a worm wheel in a speed reduction gear, and imparts the increased output power to the column thereby assisting the steering operation with amplified torque.

It is necessary to allow an appropriate amount of backlash in the engaging of a small gear and a large gear to function as a speed reducing mechanism. However, when the direction of rotation of a gear is reversed or when the reaction force of the road to the tire is transmitted to the gear during travel on a rough road such as stone-paved road, backlash may cause a sound of striking gear teeth which, when transmitted into the cabin as a noise, may cause the driver to feel uneasy.

For this reason, the speed reduction gear has been conventionally built by so-called by-layer assembly in which a small gear and a large gear are selected to form such a combination that has optimum backlash. However, such a method of assembly leads to a significantly low productivity. In addition, when the by-layer assembly is used, there remains another problem that the steering torque fluctuates due to eccentricity in the alignment of worm wheel shaft. Such problems as described above are not limited to the speed reduction gear of an electric power steering apparatus, and are encountered in speed reduction gears in general that comprise small gears and large gears.

Accordingly, it has been proposed for the speed reduction gear of an electric power steering apparatus, to enable the worm shaft to be shifted toward the worm wheel and provide urging means such as a spring for urging the worm shaft in the shifted direction, thereby to eliminate backlash (see, for example, Japanese Unexamined Patent Publication No. 2000-43739).

However, the speed reduction gear described above has very complicated structure, which leads to increasing manufacturing cost.

DISCLOSURE OF THE INVENTION

An object of the present invention is to provide a lubricant composition which can reduce the operating noise of a speed reduction gear more than before regardless of the amount of backlash that occurs in a combination of a small gear and a large gear and does not require more complicate structure of the speed reduction gear, a speed reduction gear which employs the lubricant composition so as to reduce noise, and an electric power steering apparatus which employs the speed reduction gear.

The lubricant composition of the present invention characterized by comprising a lubricating base oil, a calcium sulfonate-based thickener and fine particles.

According to the present invention, the fine particles which are dispersed in the lubricant composition intervene between a small gear and a large gear that engage with each other so as to suppress the tooth striking sound from being generated, thereby reducing the operating noise of the speed reduction gear.

Further, according to the present invention, the calcium sulfonate-based thickener has high capability of retaining the lubricating base oil so as to improve the capability of the lubricant composition to retain the lubricating base oil, and therefore satisfactorily prevents separation of oil, which otherwise tends to increasingly occur with time, from occurring over a long period of time. Thus separation of oil can be more surely prevented when the lubricant composition includes a higher content of the lubricating base oil for the purpose of decreasing the viscosity of the lubricant composition, which is increased by the fine particles contained therein, to an appropriate level, so that satisfactory lubrication can be maintained over an extended period of time.

Moreover, it is made possible to reduce the noise with a low cost without making the structure of the speed reduction gear more complicate, simply by adding the fine particles and selecting a proper thickener.

The calcium sulfonate-based thickener is preferably a complex of calcium sulfonate and at least one kind of calcium salt selected from among the following calcium salts:
(i) calcium carbonate,
(ii) a higher fatty acid calcium salt,
(iii) a lower fatty acid calcium salt, and
(iv) calcium borate.

When the above complex is used as the calcium sulfonate-based thickener, it is possible to further increase the effect of improving the capability of the retaining the lubricating base oil in the lubricant composition and preventing separation of oil.

The fine particles are any one kind of fine particles selected from among the following particles:
(A) buffer particles, used when one of both gears is made of a resin and the other is made of a metal,
(B) particles having intermediate hardness made of a material which is softer than a tooth surface made of a metal and is harder than a tooth surface made of a resin, used when one of both gears is made of the resin and the other is made of the metal, and
(C) metal particles made of a metal which is softer than a tooth surface made of a metal, used when both gears are made of the metal.

The fine particles are particularly preferably buffer particles which intervene between a small gear and a large gear that engage with each other so as to buffer impingement between tooth surfaces of the both gears, thereby to suppress the tooth striking sound from being generated.

When the buffer particles are used as the fine particles, since the buffer particles have both proper elasticity and hardness, it is possible to satisfactorily suppress the tooth striking sound while preventing excess increase in the steering torque of the electric power steering apparatus and generation of the rubbing sound.

Taking account of a further improvement in the above effect, an average particle diameter $D_1$ of the buffer particles is preferably within a range of 50 µm<$D_1$≦300 µm and a proportion of the buffer particles contained is preferably from 20 to 300 parts by weight based on 100 parts by weight of a total amount of the lubricating base oil and the calcium sulfonate-based thickener.

Taking account of that the lubricant composition exhibits good lubricity, a kinematic viscosity of the lubricating base oil is preferably from 5 to 200 mm$^2$/s (40° C.) and a mixing consistency (25° C.) of the lubricant composition is preferably from 265 to 475.

The speed reduction gear of the present invention characterized by comprising a small gear and a large gear, wherein a region including an engaging portion of the both gears is filled with the above lubricant composition, and is preferable in the respect that the tooth striking sound generated by backlash can be reduced.

Furthermore, the electric power steering apparatus of the present invention characterized in that an output of an electric motor for steering assist is transmitted to a steering mechanism by reducing its speed through the above speed reduction gear and is preferable in the respect that the noise in the inside of car can be reduced with a low cost.

BEST MODE FOR CARRYING OUT THE INVENTION

Figure 1:
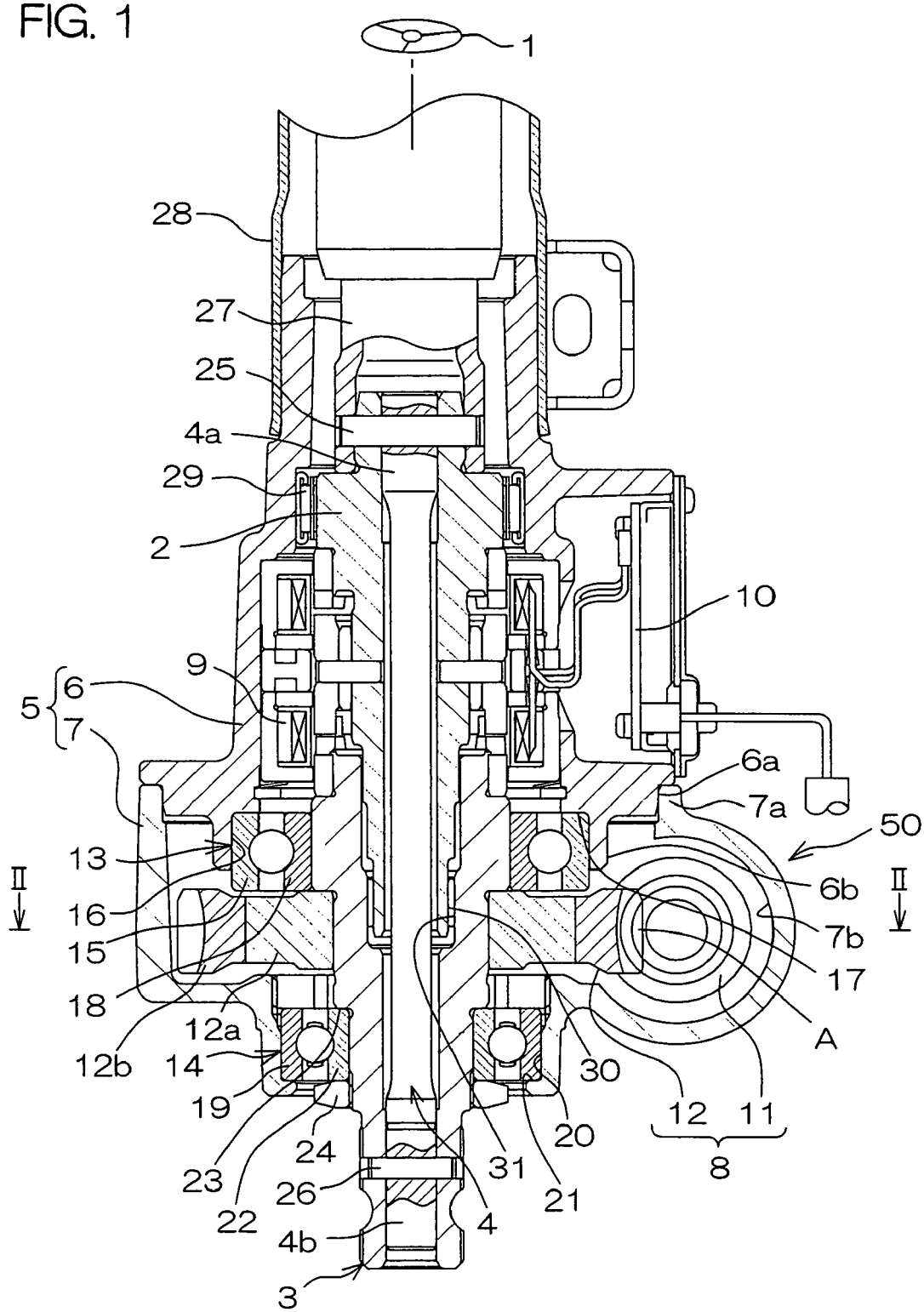
FIG. 1 is a schematic cross-sectional view showing an electric power steering apparatus according to an embodiment of the present invention.

As described above, the lubricant composition of the present invention comprises a lubricating base oil, a calcium sulfonate-based thickener and fine particles.

Various kinds of fine particles that intervene between a small gear and a large gear of the speed reduction gear that engage with each other so as to reduce the operating noise of the speed reduction gear can be used for the fine particles.

In accordance to the combination of the small gear and the large gear, any one kind of fine particles are selected from among the following three kinds of particles as fine particles:
(A) buffer particles, used when one of both gears is made of a resin and the other is made of a metal,
(B) particles having intermediate hardness made of a material which is softer than a tooth surface made of a metal and is harder than a tooth surface made of a resin, used when one of both gears is made of the resin and the other is made of the metal, and
(C) metal particles made of a metal which is softer than a tooth surface made of a metal, used when both gears are made of the metal.

Among the fine particles described above, the buffer particles of (A) have a function of intervening between the small gear and the large gear so as to buffer the impact of the gears engaging with each other and reduce the tooth striking sound. As the buffer particles, any of those made of various rubbers or soft resins having rubber elasticity can be used, and examples of the rubber include ethylene-propylene copolymer (EPM), ethylene-propylene-diene copolymer (EPDM), silicone rubber and urethane rubber (U).

Examples of the soft resin include polyolefin resin, polyamide resin, polyester resin, polyurethane resin, polyacetal resin, polyphenylene oxide resin, polyimide resin, fluororesin and thermosetting urethane resin. Further, there can be used oil-resistant thermoplastic elastomers such as thermoplastic elastomer olefin, thermoplastic elastomer urethane, thermoplastic elastomer polyester, thermoplastic elastomer polyamide and thermoplastic elastomer fluorine.

An average particle diameter $D_1$ of the buffer particles is preferably within a range of 50 µm<$D_1$≦300 µm. When the average particle diameter $D_1$ is 50 µm or smaller, it limits the effect of buffering the impact of the small gear and the large gear engaging with each other and reducing the tooth striking sound, and it may become impossible to significantly reduce the operating noise of the speed reduction gear. When the average particle diameter $D_1$ is larger than 300 µm, it may require greater steering torque of the electric power steering apparatus and may generate rubbing sound.

For the purpose of further improving the effect of reducing the tooth striking sound, average particle diameter of the buffer particles is more preferably 100 µm or more, among the range described above. For the purpose of suppressing the steering torque from increasing and the rubbing sound from occurring more surely, the average particle diameter of the buffer particles is more preferably 200 µm or less, among the range described above.

A proportion of the buffer particles contained is preferably from 20 to 300 parts by weight based on 100 parts by weight of a total amount of the lubricating base oil and the calcium sulfonate-based thickener.

When the proportion of the buffer particles is less than 20 parts by weight, the effect of intervening between the small gear and the large gear so as to buffer the impact of the gears engaging with each other and reduce the tooth striking sound of the speed reduction gear may become insufficient. On the other hand, when the proportion of the buffer particles is more than 300 parts by weight, it may require greater steering torque of the electric power steering apparatus and may generate rubbing sound to increase the operating noise of the speed reduction gear by contraries.

Taking account of further improvement in the effect of reducing tooth striking sound, the proportion of the buffer particles is particularly preferably 25 parts by weight or more within the above range. Taking account of more certain prevention of the greater steering torque and the generation of rubbing sound, the proportion of the buffer particles is particularly preferably 100 parts by weight or less within the above range.

When the speed reduction gear is operated, the input enables a portion of the above particles (B) having intermediate hardness to bite into the tooth surface made of a resin which is softer than the particles among a small gear and a large gear, and to be fixed in the state of protruding a portion of the particles from the tooth surface, and thus a large number of protrusions are formed on the tooth surface. This protrusion has a function of optimizing backlash thereby to reduce the operating noise of the speed reduction gear.

As the particles having intermediate hardness, there can be used those formed of various organic or inorganic materials which is softer than the tooth surface made of a metal, and is harder than the tooth surface made of a metal, to be used in combination.

However, taking account of prevention of the generation of the noise on collision between the protrusion made of the particles having intermediate hardness and the metal surface, scratching of the metal surface due to the protrusion, and easy cracking or smashing of the protrusion, the particles having intermediate hardness are preferable formed of a resin which is particularly excellent in elasticity and toughness.

When the tooth surface made of a resin is formed of a polyamide-based resin (unreinforced resin) generally used for a resin gear, the particles having intermediate hardness may be formed of a resin which is harder than the polyimide-based resin and is softer than the metal surface. Specific examples thereof include so-called engineering plastics such as polyphenylene sulfide (PPS) and polyether ether ketone (PEEK), and cured articles of thermosetting resins. The hardness can be defined, for example, by Rockwell hardness.

The average particle diameter of the particles having intermediate hardness is preferably from 10 to 200 μm. When the average particle diameter is less than 10 μm, the effect of optimizing backlash may become insufficient because the height of the protrusion formed on the tooth surface made of a resin is too small. On the other hand, when the average particle diameter is more than 200 μm, a uniform lubricant composition may not be obtained because the particles are likely to be separated from the lubricant.

Taking account of flexible correspondence to variation in backlash of a small gear and a large gear to combined, and reduction of the noise due to filling the engaging portion of the small gear and the large gear with excess particles having intermediate hardness which were not fixed to the tooth surface made of a resin, the particles having intermediate hardness preferably has particle diameter distribution to some extent, not monodispersion particle diameter distribution.

Input due to operation of the speed reduction gear enables particles having comparatively large particle diameter among the particles having intermediate hardness to bite into the tooth surface made of a resin. However, particles having a small particle diameter have a function of filling the gap between protrusions formed, thereby to further reduce the noise without being fixed.

The shape of the particles having intermediate hardness can be selected from various shapes. However, taking account of easiness to bite into the tooth surface made of a resin, the shape of the protrusion after biting, or fluidity of the lubricant composition, the particles having intermediate hardness is preferably spherical or granular.

A proportion of the particles having intermediate hardness is preferably from 3 to 50 parts by weight based on 100 parts by weight of a total amount of the lubricating base oil and the calcium sulfonate-based thickener.

When the proportion of the particles having intermediate hardness is less than 3 parts by weight, the effect of optimizing backlash by forming protrusions may become insufficient. On the other hand, when the proportion is more than 50 parts by weight, fluidity of the lubricant composition deteriorates and the lubricant composition may not function as a lubricant.

The metal particles made of the soft metal (C) have a function of optimizing backlash thereby to reduce the operating noise of the speed reduction gear by previous intervention of the metal particles in an engaging portion between a small gear and a large gear at the initial stage of lubrication, and by crushing due to engaging of the small gear and the large gear thereby to adhere to the tooth surfaces made of a metal of the both gears in the form of a layer at the following stage.

As such metal particles, there can be used particles made of various metals and alloys which are softer than the tooth surface made of a metal to be used in combination. Specifically, when the tooth surface is made of iron or steel, for example, particles made of bronze, copper, tin, zinc, silver, gold and aluminum can be used as the metal particles.

The metal particles can be produced by various conventionally known methods such as electrolytic method, grinding method and atomization method.

The average particle diameter of the metal particles is preferably from 5 to 150 μm. When the average particle diameter is less than 5 μm, the effect of optimizing backlash by intervention of the metal particles in an engaging portion between a small gear and a large gear at the initial stage of lubrication may become insufficient. On the other hand, when the average particle diameter is more than 150 μm, a uniform lubricant composition may not be obtained because the metal particles are liable to be separated from the lubricant.

The proportion of the metal particles is preferably from 3 to 50 parts by weight based on 100 parts by weight of a total amount of the lubricating base oil and the calcium sulfonate-based thickener.

When the proportion of the metal particles is less than 3 parts by weight, the effect of optimizing backlash by intervention of metal particles in an engaging portion between a small gear and a large gear at the initial stage of lubrication and by adhering to the tooth surface made of a metal thereafter may become insufficient. On the other hand, when the amount is more than 50 parts by weight, the lubricant composition can not function as a lubricant because fluidity deteriorates.

The calcium sulfonate-based thickener includes a complex of calcium sulfonate and at least one kind of calcium salt selected from among the following calcium salts: (i) calcium carbonate, (ii) a higher fatty acid calcium salt such as calcium dibehenate, calcium distearate or calcium dihydroxystearate, (iii) a lower fatty acid calcium salt such as calcium acetate, and (iv) calcium borate.

Examples of the calcium sulfonate which forms the complex together with the calcium salts (i) to (iv) include a polycondensation of calcium naphthalenesulfonate and formalin, a polycondensation of calcium melaminesulfonate and formalin, and petroleum sulfonic acid calcium sulfonate alone or in combination.

As described above, the calcium sulfonate-based thickener is excellent in capability of retaining the lubricating base oil, because very small fibrous particles are produced in the lubricant composition, as compared with the other metal soap-based thickener. Therefore, it is possible to satisfactorily prevent separation of oil, which otherwise tends to increasingly occur with time, from occurring over a long period of time by improving capability of retaining the lubricating base oil in the lubricant composition. The amount of the calcium sulfonate-based thickener can be appropriately set according to the kind or amount of the fine particles, or consistency of the objective lubricant composition.

As the thickener, a small amount of other metal soap-based thickener, or an inorganic or organic non-soap-based thickener may be used in combination as far as an adverse influence is not exerted on the effect of the present invention.

The lubricating base oil is preferably a synthetic hydrocarbon oil (for example, poly-a-olefin oil), but synthetic oil such as silicone oil, fluorine oil, ester oil and ether oil or mineral oil can also be used. These lubricating base oils may be used alone or in combination. A kinematic viscosity of the lubricating base oil is preferably from 5 to 200 mm$^2$/s (40° C.), and particularly preferably from 20 to 100 mm$^2$/s (40° C.).

Mixing consistency (25° C.) of the lubricant composition is preferably from 265 to 475, and particularly preferably from 355 to 430.

If necessary, solid lubricants (molybdenum disulfide, graphite, PTFE and the like); phosphorus or sulfur-based extreme pressure agents; antioxidants such as tributylphenol or methylphenol; anti-rust agents; metal deactivators; viscosity index improvers; and oily agents may be added to the lubricant composition.

<Speed Reduction Gear and Electric Power Steering Apparatus>

Figure 2:
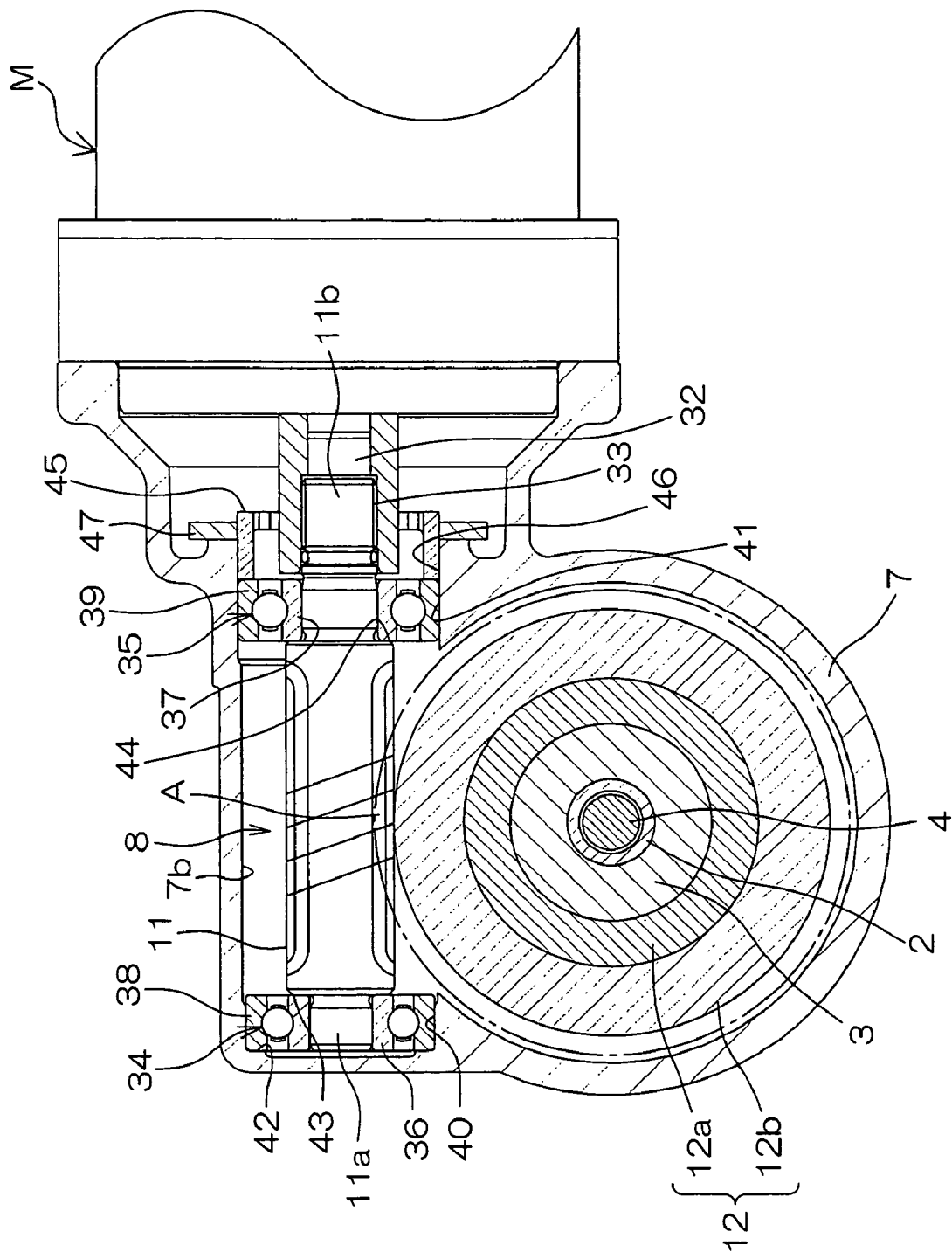
FIG. 2 is a cross-sectional view taken along a line II-II of FIG. 1.

FIG. 1 is a schematic sectional view of an electric power steering apparatus according to an embodiment of the present invention. FIG. 2 is a cross-sectional view taken along a line II-II shown in FIG. 1.

Referring to FIG. 1, in the electric power steering apparatus in this example, a first steering shaft 2 serving as an input shaft to which a steering wheel 1 is attached and a second steering shaft 3 serving as an output shaft connected to a steering mechanism (not shown) such as a rack-and-pinion mechanism are coaxially connected to each other through a torsion bar 4.

A housing 5 for supporting the first and second steering shafts 2 and 3 is composed of an aluminum alloy, for example, and is attached to an automobile body (not shown). The housing 5 comprises a sensor housing 6 and a gear housing 7 which are fitted to each other. Specifically, the gear housing 7 has a cylindrical shape, and an annular edge 7a at its upper end is fitted in an annular step 6a in the outer periphery at a lower end of the sensor housing 6. The gear housing 7 accommodates a worm gear mechanism 8 serving as a speed reduction mechanism, and the sensor housing 6 accommodates a torque sensor 9, a control board 10, and so on. A speed reduction gear 50 is configured by accommodating the worm gear mechanism 8 in the gear housing 7.

The worm gear mechanism 8 comprises a worm wheel 12 which is rotatable integrally with an intermediate portion in the axial direction of the second steering shaft 3 and whose movement in the axial direction is regulated, and a worm shaft 22 (see FIG. 2) which is engaged with the worm wheel 12 and is connected to a rotating shaft 32 in an electric motor M through a spline joint 33.

The worm wheel 12 comprises an annular core metal 12a coupled to the second steering shaft 3 so as to be integrally rotatable, and a synthetic resin member 12b surrounding the core metal 12a and having teeth formed on its outer peripheral surface. The core metal 12a is inserted into a metal mold at the time of resin molding of the synthetic resin member 12b, for example. The core metal 12a and the synthetic resin member 12b are coupled to and integrally with each other by resin molding in a state where the core metal 12a is inserted into the metal mold.

The second steering shaft 3 is supported so as to be rotatable by first and second rolling bearings 13 and 14 arranged with the worm wheel 12 interposed on the upper and lower sides in the axial direction therebetween.

An outer ring 15 in the first rolling bearing 13 is fitted in a bearing holding hole 16 provided inside a cylindrical projection 6b at a lower end of the sensor housing 6 and is held therein. An upper end surface of the outer ring 15 is abutted against an annular step 17 so that the upward movement in the axial direction of the outer ring 15 relative to the sensor housing 6 is regulated.

On the other hand, an inner ring 18 in the first rolling bearing 13 is fitted in the second steering shaft 3 by way of interference fit. A lower end surface of the inner ring 18 is abutted against an upper end surface of the core metal 12a in the worm wheel 12.

An outer ring 19 in the second rolling bearing 14 is fitted in a bearing holding hole 20 in the gear housing 7 and is held therein. A lower end surface of the outer ring 19 is abutted against an annular step 21 so that the downward movement in the axial direction of the outer ring 19 relative to the gear housing 7 is regulated.

On the other hand, an inner ring 22 in the second rolling bearing 14 is attached to the second steering shaft 3 so as to be integrally rotatable and with the relative movement in the axial direction regulated. The inner ring 22 is interposed between a step 23 in the second steering shaft 3 and a nut 24 tightened into a screw of the second steering shaft 3.

The torsion bar 4 penetrates the first and second steering shafts 2 and 3. An upper end 4a of the torsion bar 4 is connected to the first steering shaft 2 so as to be integrally rotatable by a connecting pin 25, and a lower end 4b of the torsion bar 4 is connected to the second steering shaft 3 so as to be integrally rotatable by a connecting pin 26. A lower end of the second steering shaft 3 is connected to a steering mechanism such as a rack-and-pinion mechanism, as described above, through an intermediate shaft (not shown)

The connecting pin 25 connects to the first steering shaft 2 with a third steering shaft 27 arranged coaxially with the first steering shaft 2 so as to be integrally rotatable. The third steering shaft 27 penetrates a tube 28 composing a steering column.

An upper part of the first steering shaft 2 is supported on the sensor housing 6 through a third rolling bearing 29 composed of a needle roller bearing, for example, so as to be rotatable. A reduced diameter portion 30 in a lower part of the first steering shaft 2 and a hole 31 in an upper part of the second steering shaft 3 are fitted to each other with predetermined play provided therebetween in the direction of rotation such that the relative rotation between the first and second steering shafts 2 and 3 is regulated in a predetermined range.

Referring now to FIG. 2, the worm shaft 11 is supported so as to be rotatable by fourth and fifth rolling bearings 34 and 35 held by the gear housing 7.

Inner rings 36 and 37 in the fourth and fifth rolling bearings 34 and 35 are fitted in corresponding constricted portions of the worm shaft 11. Further, outer rings 38 and 39 are respectively held in bearing holding holes 40 and 41 in the gear housing 7.

The gear housing 7 includes a portion 7b opposed to a part of a peripheral surface of the worm shaft 11 in the radial direction.

The outer ring 38 in the fourth rolling bearing 34 for supporting one end 11a of the worm shaft 11 is abutted against a step 42 in the gear housing 7 and is positioned therein. On the other hand, the inner ring 36 is abutted against a positioning step 43 in the worm shaft 11, thereby regulating the movement thereof toward the other end 11b.

The inner ring 37 in the fifth rolling bearing 35 for supporting the vicinity of the other end 11b of the worm shaft 11 (an end on the side of a joint) is abutted against a positioning step 44 in the worm shaft 11, thereby regulating the movement thereof toward the one end 11a. Further, the outer ring 39 is urged toward the fourth rolling bearing 34 by a screw member 45 for pre-load adjustment. The screw member 45 is screwed into a screw hole 46 formed in the gear housing 7, thereby applying a pre-load to the pair of rolling bearings 34 and 35 as well as positioning the worm shaft 11 in the axial direction. Reference numeral 47 denotes a lock nut which is engaged with the screw member 45 in order to fasten the screw member 45 after pre-load adjustment.

In the gear housing 7, an area including at least an engaged portion A of the worm shaft 11 and the worm wheel 12 is filled with the lubricant composition having the buffer particles dispersed therein, previously described. That is, with the lubricant composition, only the engaged portion A may be filled, the engaged portion A and the whole of a peripheral edge of the worm shaft 11 may be filled, or the whole inside of the gear housing 7 may be filled.

The present invention is not limited to the above-mentioned embodiment. For example, as the fine particles, in case of using (A) buffer particles or (B) particles having intermediate hardness, the worm shaft 11 made of metal is used in combination with the worm wheel 12 forming teeth on outer peripheral surface of a synthetic resin member 12b. However, in case of using (C) metal particles, the whole worm wheel 12 is formed of metal, and it may be combined with the worm shaft 11 made of metal. Various modifications can be made within the range of items described in the claims of the present invention. For example, the configuration of the speed reduction gear according to the present invention is applicable to speed reduction gears for apparatuses other than the electric power steering apparatus.

EXAMPLES

The present invention will now be described in detail by way of examples.

Example 1

While mixing grease containing a synthetic hydrocarbon oil [PA08 Grade, kinematic viscosity: 48 mm$^2$/s (40° C.)] as a lubricating base oil and a calcium sulfonate-based thickener using a three-roll mill, the same lubricating base oil and polyurethane resin particles having an average particle diameter of 150 μm as buffer particles were added, followed by mixing to obtain a lubricant composition. The amount of the additional lubricating base oil was adjusted so as to adjust mixing consistency (25° C.) of the resulting lubricant composition to about 400.

As the calcium sulfonate-based thickener, a complex of petroleum sulfonic acid calcium sulfonate and four kinds of calcium salts of calcium carbonate, calcium dihydroxystearate, calcium acetate and calcium borate was used.

The proportion of the polyurethane resin particles was adjusted to 25 parts by weight based on 100 parts by weight of the total amount of the lubricating base oil and the calcium sulfonate-based thickener, and the proportion of the polyurethane resin particles was adjusted to 20% by weight based on the total amount of the lubricant composition. Mixing consistency (25° C.) of the resulting lubricant composition was 407.

Example 2

In the same manner as in Example 1, except that the proportion of the polyurethane resin particles was adjusted to 50 parts by weight based on 100 parts by weight of the total amount of the lubricating base oil and the calcium sulfonate-based thickener, and the proportion of the polyurethane resin particles was adjusted to 30% by weight based on the total amount of the lubricant composition, a lubricant composition was produced. Mixing consistency (25° C.) of the resulting lubricant composition was 409.

Example 3

In the same manner as in Example 1, except that the proportion of the polyurethane resin particles was adjusted to 67 parts by weight based on 100 parts by weight of the total amount of the lubricating base oil and the calcium sulfonate-based thickener, and the proportion of the polyurethane resin particles was adjusted to 40% by weight based on the total amount of the lubricant composition, a lubricant composition was produced. Mixing consistency (25° C.) of the resulting lubricant composition was 404.

Comparative Example 1

In the same manner as in Example 1, except that the polyurethane resin particles were not added, a lubricant composition was produced. Mixing consistency (25° C.) of the resulting lubricant composition was 398.

Comparative Example 2

In the same manner as in Example 2, except that an aromatic diurea-based thickener was used as the thickener, a lubricant composition was produced. Mixing consistency (25° C.) of the resulting lubricant composition was 401.

Comparative Example 3

In the same manner as in Example 2, except that an aliphatic diurea-based thickener was used as the thickener, a lubricant composition was produced. Mixing consistency (25° C.) of the resulting lubricant composition was 393.

Comparative Example 4

In the same manner as in Example 2, except that a barium complex-based thickener was used as the thickener, a lubricant composition was produced. Mixing consistency (25° C.) of the resulting lubricant composition was 388.

Test on Oil Separation Degree

Oil separation degrees (%) as measured at 100° C. for 24 hours of the lubricant compositions produced in the above respective examples and comparative examples were measured according to a test procedure defined in Japanese Industrial Standard JIS K2220: 2003 "Grease". The results are shown in Table 1.

Measurement of Tooth Striking Sound

After filling an actual speed reduction gear of an electric power steering apparatus shown in FIGS. 1 and 2 with each of the lubricant compositions produced in the above respective examples and comparative examples, tooth striking sound (dB (A)) was measured. A worm gear mechanism was composed of a worm made of iron-based metal and a worm wheel made of a polyamide-based resin. Backlash was set to 2'. The results are shown in Table 1. In the table, symbols in the column of the thickener are as follows.

Ca-sul: Calcium sulfonate-based thickener

Alom-urea: Aromatic diurea-based thickener

Phat-urea: Aliphatic diurea-based thickener

Ba-compl: Barium complex-based thickener

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Thickener | Ca-sul | Ca-sul | Ca-sul | Ca-sul | Alom-urea | Phat-urea | Ba-compl |
| Buffer particles (% by weight) | 20 | 30 | 40 | 0 | 30 | 30 | 30 |
| Mixing consistency | 407 | 409 | 404 | 398 | 401 | 393 | 388 |
| Oil separation degree (%) | 5.1 | 5.4 | 5.3 | 5.5 | 10.9 | 9.4 | 11.0 |
| Tooth striking sound (dB(A)) | 51 | 50 | 50 | 57 | 50 | 50 | 50 |

As is apparent from the table, the lubricant compositions of Comparative Examples 2 and 3 containing polyurethane particles added therein could reduce tooth striking sound as compared with the lubricant composition of Comparative Example 1 containing no polyurethane particles, but showed a higher oil separation degree than that of Comparative Example 1. To the contrary, all the lubricant compositions of Examples 1 to 3 could reduce tooth striking sound as compared with the lubricant composition of Comparative Example 1 and also could reduce the oil separation degree similar to Comparative Example 1.

The invention claimed is:

1. A lubricant composition having a mixing consistency (at 25° C.) adjusted to range from 265 to 475, for noise reduction of a speed reduction gear when filled into an engaged portion of a small gear and a large gear of the speed reduction gear, the lubricant composition consisting essentially of:
   a lubricating base oil;
   a thickener that is a calcium sulfonate-based thickener comprised of calcium sulfonate and that is mixed into the lubricating base oil to prevent oil separation; and
   buffer particles that are dispersed within the lubricating base oil so that the lubricant composition has the mixing consistency (at 25° C.) adjusted to range from 265 to 475, that have an average particle diameter, $D_1$, ranging from 100 μm to 200 μm, and that are made of soft resin selected from the group consisting of polyolefin resin, polyamide resin, polyester resin, polyurethane resin, polyacetal resin, polyphenylene oxide resin, polyimide resin, fluororesin and thermosetting urethane resin, for use when one of the small gear and the large gear is made of a resin and another of the small gear and the large gear is made of a metal, in an amount of from 20 to 300 parts by weight, based on 100 parts by weight of a total amount of the lubricating base oil and the calcium sulfonate-based thickener.

2. The lubricant composition according to claim 1, wherein the calcium sulfonate-based thickener is a complex of calcium sulfonate and at least one calcium salt selected from the group consisting of calcium carbonate, a higher fatty acid calcium salt, a lower fatty acid calcium salt, and calcium borate.

3. The lubricant composition according to claim 1, wherein the lubricating base oil has a kinematic viscosity ranging from 5 to 200 mm$^2$/s (40° C.).

4. A speed reduction gear, comprising:
   a small gear; and
   a large gear that engages the small gear and defines a region including an engaged portion of both gears that is filled with the lubricant composition of claim 1.

5. An electric power steering apparatus, comprising:
   a steering mechanism;
   a speed reduction gear according to claim 4; and
   an electric motor for steering assist having an output that is transmitted to the steering mechanism by reducing its speed through the speed reduction gear.

* * * * *